United States Patent
Ardisana et al.

(10) Patent No.: US 12,081,728 B2
(45) Date of Patent: Sep. 3, 2024

(54) PORTABLE 3D PROJECTOR WITH SHARING TO MULTIPLE VIEWERS

(71) Applicants: John Bernard Ardisana, Torrance, CA (US); Yoav Ben-Haim, Culver City, CA (US); Teodor Dabov, Los Angeles, CA (US); Varun Sehrawat, Playa Vista, CA (US)

(72) Inventors: John Bernard Ardisana, Torrance, CA (US); Yoav Ben-Haim, Culver City, CA (US); Teodor Dabov, Los Angeles, CA (US); Varun Sehrawat, Playa Vista, CA (US)

(73) Assignee: Snap Inc., Santa Monica, CA (US)

( * ) Notice: Subject to any disclaimer, the term of this patent is extended or adjusted under 35 U.S.C. 154(b) by 7 days.

(21) Appl. No.: 17/849,464

(22) Filed: Jun. 24, 2022

(65) Prior Publication Data

US 2022/0329776 A1 Oct. 13, 2022

Related U.S. Application Data

(63) Continuation of application No. 16/989,976, filed on Aug. 11, 2020, now Pat. No. 11,394,954.

(60) Provisional application No. 62/888,606, filed on Aug. 19, 2019.

(51) Int. Cl.
H04N 13/363 (2018.01)
H04N 13/172 (2018.01)
H04N 13/239 (2018.01)
H04N 13/296 (2018.01)
(Continued)

(52) U.S. Cl.
CPC ......... *H04N 13/363* (2018.05); *H04N 13/172* (2018.05); *H04N 13/239* (2018.05); *H04N 13/296* (2018.05); *H04N 13/344* (2018.05); *H04N 13/398* (2018.05)

(58) Field of Classification Search
CPC .. H04N 13/363; H04N 13/172; H04N 13/239; H04N 13/296; H04N 13/344; H04N 13/398; H04N 2013/405; H04N 13/341; H04N 19/132; H04N 19/105;
(Continued)

(56) References Cited

U.S. PATENT DOCUMENTS

| | | | |
|---|---|---|---|
| 9,082,214 B2 * | 7/2015 | Smoot | G06F 3/017 |
| 10,984,607 B1 * | 4/2021 | Wang | G06F 3/011 |
| 11,025,892 B1 | 6/2021 | Aman et al. | |

(Continued)

*Primary Examiner* — Susan E. Torgerson
(74) *Attorney, Agent, or Firm* — Culhane PLLC; Stephen J. Weed

(57) ABSTRACT

Systems, devices, media, and methods are presented for capturing and sharing visual content, especially three-dimensional video, with a plurality of users with compatible devices. The methods in some implementations include transmitting the visual content to a portable projector, generating a unique invite and broadcasting it to a plurality of eyewear devices, and projecting the visual content onto a screen for viewers who accepted the invite and are wearing a compatible eyewear device. For projection in 3D format, the eyewear devices include an active shutter mode. The portable projector may be housed in the interior of a case. In some configurations, the case interior is sized and shaped to support the projector and an eyewear device. The system may include multiple projectors at remote locations directed to project the visual content simultaneously.

19 Claims, 12 Drawing Sheets

(51) Int. Cl.
*H04N 13/344* (2018.01)
*H04N 13/398* (2018.01)

(58) Field of Classification Search
CPC .... H04N 19/159; H04N 19/176; H04N 19/11; H04N 19/12; H04N 19/157; H04N 19/593
USPC .......................................................... 348/43
See application file for complete search history.

(56) References Cited

U.S. PATENT DOCUMENTS

| | | |
|---|---|---|
| 11,394,954 B1 | 7/2022 | Ardisana et al. |
| 2013/0027526 A1 | 1/2013 | Mao |
| 2015/0348327 A1* | 12/2015 | Zalewski .................. G06F 3/01 345/419 |
| 2016/0014391 A1* | 1/2016 | Hosenpud ............ H04N 13/366 348/46 |
| 2017/0365102 A1 | 12/2017 | Huston et al. |
| 2018/0131847 A1 | 5/2018 | Kokonaski et al. |
| 2018/0246328 A1* | 8/2018 | Song ..................... G06F 16/176 |
| 2019/0121522 A1* | 4/2019 | Davis .................... G06V 40/28 |

\* cited by examiner

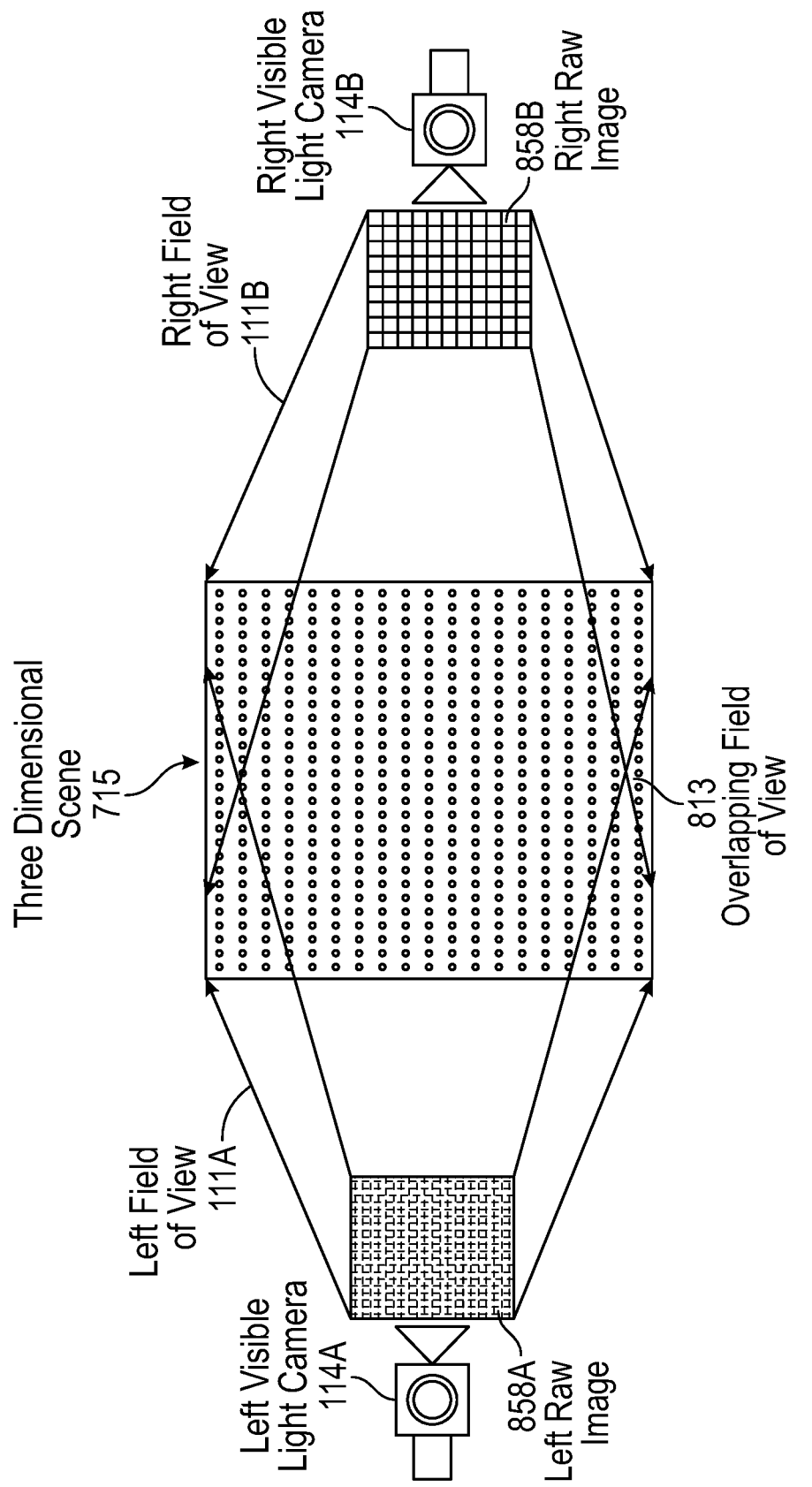

PORTABLE 3D PROJECTOR WITH SHARING TO MULTIPLE VIEWERS

CROSS-REFERENCE TO RELATED APPLICATIONS

This application claims is a Continuation of U.S. application Ser. No. 16/989,976 filed on Aug. 11, 2020, and claims priority to U.S. Provisional Application Ser. No. 62/888,606 filed on Aug. 19, 2019, the contents of both of which are incorporated fully herein by reference.

TECHNICAL FIELD

Examples set forth in the present disclosure relate to portable electronic devices, including wearable devices such as eyewear. More particularly, but not by way of limitation, the present disclosure describes systems and methods for capturing visual content and projecting it for a plurality of users wearing compatible wearable devices.

BACKGROUND

Many types of computers and mobile devices available today include one or more cameras (or dual cameras) for capturing visual content, including still photographs and video. Wearable devices such as portable eyewear devices (e.g., smartglasses, headwear, and headgear) may also include one or more cameras that capture and store images. Users want a variety of methods and platforms for sharing and watching visual content with others.

BRIEF DESCRIPTION OF THE DRAWINGS

Features of the various implementations disclosed will be readily understood from the following detailed description, in which reference is made to the appending drawing figures. A reference numeral is used with each element in the description and throughout the several views of the drawing. When a plurality of similar elements is present, a single reference numeral may be assigned to like elements, with an added lower-case letter referring to a specific element.

The various elements shown in the figures are not drawn to scale unless otherwise indicated. The dimensions of the various elements may be enlarged or reduced in the interest of clarity. The several figures depict one or more implementations and are presented by way of example only and should not be construed as limiting. Included in the drawing are the following figures:

FIG. 3 is a diagrammatic depiction of a three-dimensional scene, a left raw image captured by a left visible-light camera, and a right raw image captured by a right visible-light camera;

DETAILED DESCRIPTION

Figure 1A:
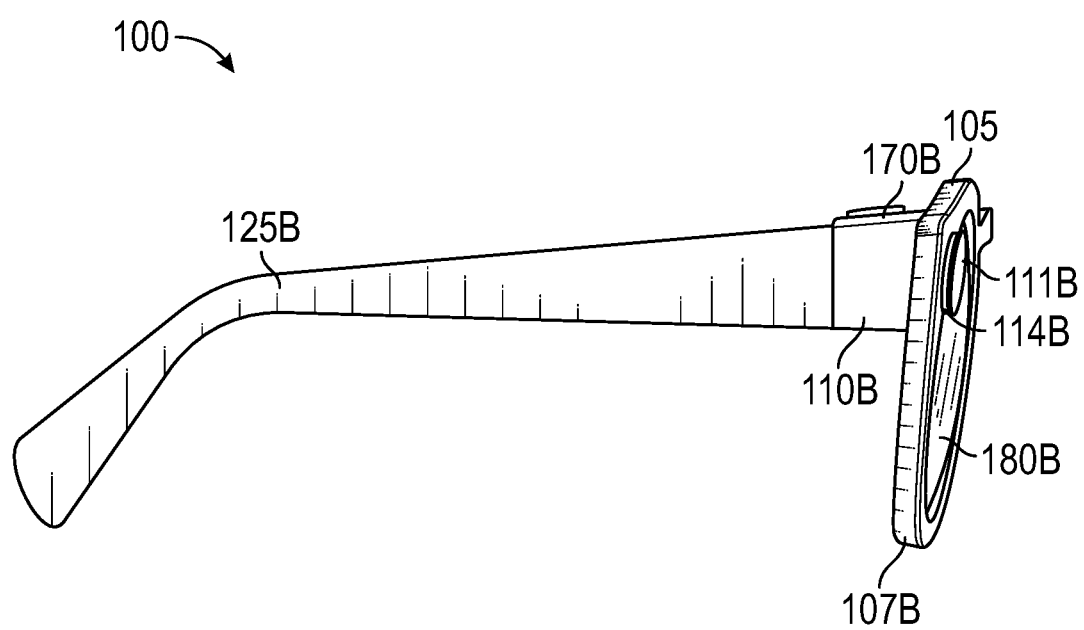
FIG. 1A is a right side view of an example hardware configuration of an eyewear device that may be utilized in an visual content sharing system.

Various implementations and details are described with reference to an example: a visual content sharing system for capturing visual content, generating a unique invite and broadcasting it to others, and projecting the visual content from a projector onto a screen for viewing by multiple users who are wearing a compatible eyewear device. For projection in 3D format, the eyewear devices include an active shutter mode. The portable projector may be housed in the interior of a case. In some configurations, the case interior is sized and shaped to support the projector and an eyewear device. The system may include multiple projectors at remote locations directed to project the visual content simultaneously. In addition to the visual content sharing system, the systems and methods described herein may be applied to and used with any of a variety of systems, especially those for which widely distributed content with precise control is desired.

The following detailed description includes systems, methods, techniques, instruction sequences, and computing machine program products illustrative of examples set forth in the disclosure. Numerous details and examples are included for the purpose of providing a thorough understanding of the disclosed subject matter and its relevant teachings. Those skilled in the relevant art, however, may understand how to apply the relevant teachings without such details. Aspects of the disclosed subject matter are not limited to the specific devices, systems, and method described because the relevant teachings can be applied or practice in a variety of ways. The terminology and nomenclature used herein is for the purpose of describing particular aspects only and is not intended to be limiting. In general, well-known instruction instances, protocols, structures, and techniques are not necessarily shown in detail.

The term "coupled" or "connected" as used herein refers to any logical, optical, physical, or electrical connection, including a link or the like by which the electrical or magnetic signals produced or supplied by one system element are imparted to another coupled or connected system element. Unless described otherwise, coupled or connected elements or devices are not necessarily directly connected to one another and may be separated by intermediate components, elements, or communication media, one or more of which may modify, manipulate, or carry the electrical signals. The term "on" means directly supported by an element or indirectly supported by the element through another element integrated into or supported by the element.

The orientations of the eyewear device, associated components and any complete devices incorporating a three-dimensional camera such as shown in any of the drawings, are given by way of example only, for illustration and discussion purposes. In operation, the eyewear device may be oriented in any other direction suitable to the particular application of the eyewear device; for example, up, down, sideways, or any other orientation. Also, to the extent used herein, any directional term, such as front, rear, inward, outward, toward, left, right, lateral, longitudinal, up, down, upper, lower, top, bottom, side, horizontal, vertical, and diagonal are used by way of example only, and are not limiting as to direction or orientation of any three-dimensional camera or component of the three-dimensional camera constructed as otherwise described herein.

Additional objects, advantages and novel features of the examples will be set forth in part in the following description, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

A wide variety of visible-light cameras are integrated into portable electronic devices, including mobile phones and wearable devices like smartglasses. A stereo camera has two lenses, each with its own image sensor or film frame. A stereo camera captures two images of the same scene, taken from slightly different perspectives because the lenses are spaced apart. The separation distance between the lenses may be sized to approximate the distance between a person's eyes, to better simulate human binocular vision. A stereo camera captures two separate images of the same scene, taken from slightly different perspectives.

Projecting the two images for viewing in 3D can be accomplished by a single projector or by a pair of dual projectors. A single digital projector, for example, may include a modulator that separates the images (a left channel image and a right channel image) and a single lens that projects both images onto a screen for viewing with special 3D glasses. In a dual projector arrangement, the left projector displays the left channel image; the right projector displays the right channel image. In the 3D glasses, the right lens is filtered or otherwise configured to view the right channel image; the left lens is configured to view the left channel image.

There are two types of 3D glasses; passive and active. Most types of passive glasses include a filter in each lens. The rights lens filter is matched to the right channel image; the left filter is matched to the left channel image. Active 3D glasses use a system called active shutter. Each lens includes electronics that open and close each lens, in a rapid and alternating sequence that is in synchronization with the refresh rate of the 3D image projected on the screen. The active shutter system opens the left lens while closing the right lens, and then opens the right lens while closing the left lens, in rapid succession, so that the two images (left and right) are perceived by the viewer as a single 3D image. The lenses may include a liquid crystal display layer (LCD layer) that is transparent (open) unless and until a voltage is applied which makes the layer opaque (closed). Some types of 3D-capable projectors, such as Digital Light Processing (DLP) projectors, may be configured to send a synchronization signal to active-shutter 3D glasses that will synchronize the lens shuttering with the refresh rate of the digital projector.

Reference now is made in detail to the examples illustrated in the accompanying drawings and discussed below.

FIG. 1A is a right side view of an example hardware configuration of an eyewear device 100 utilized in a projection system, as described herein, which shows a right visible-light camera 114B for gathering image information. As further described below, two cameras 114A, 114B capture image information for a scene from two separate viewpoints. The two captured images may be used to project a three-dimensional display onto a screen for viewing with 3D glasses.

Figure 1B:
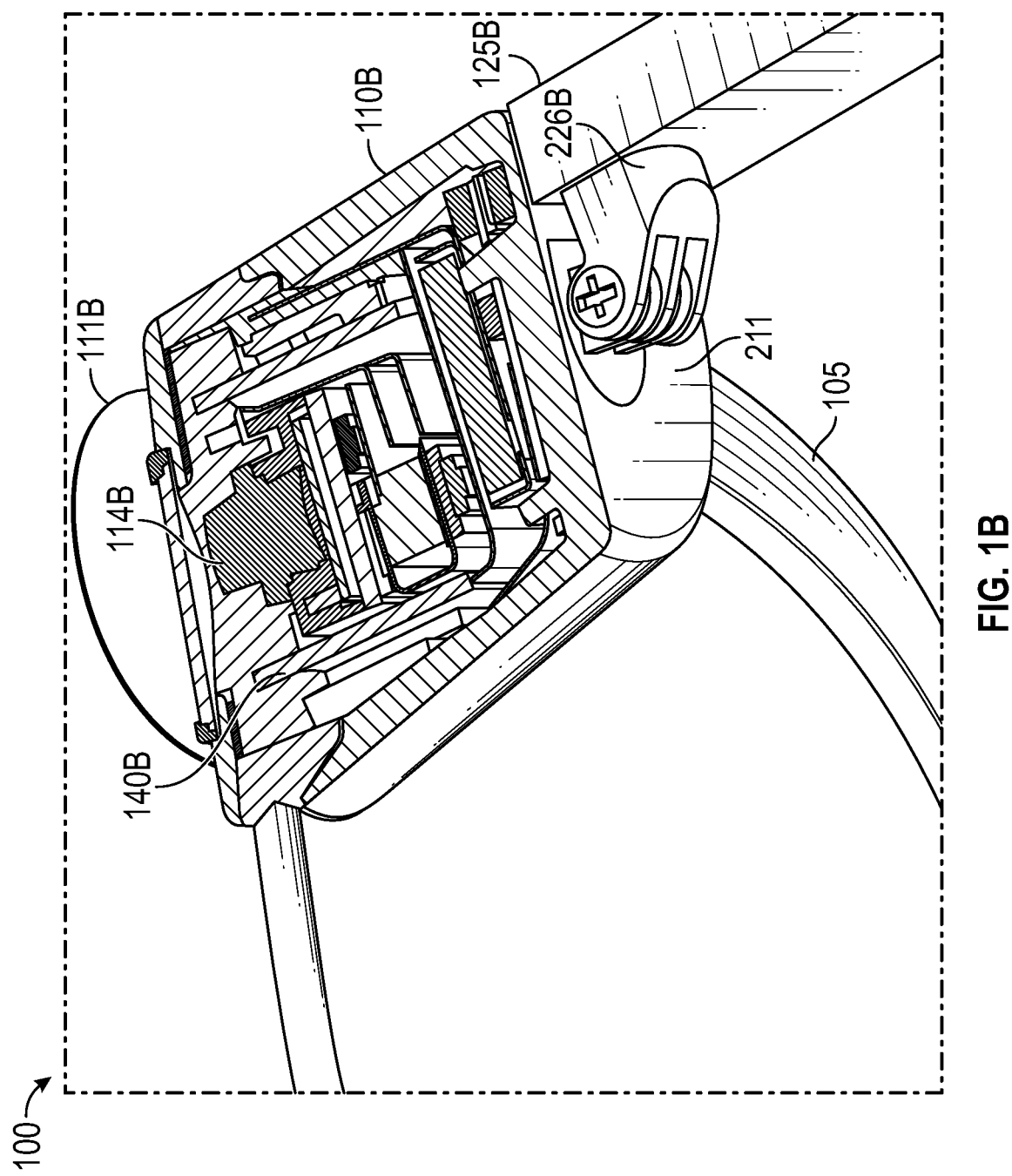
FIG. 1B is a top, partly sectional view of a right chunk of the eyewear device of FIG. 1A depicting a right visible-light camera, and a circuit board.
Figure 1C:
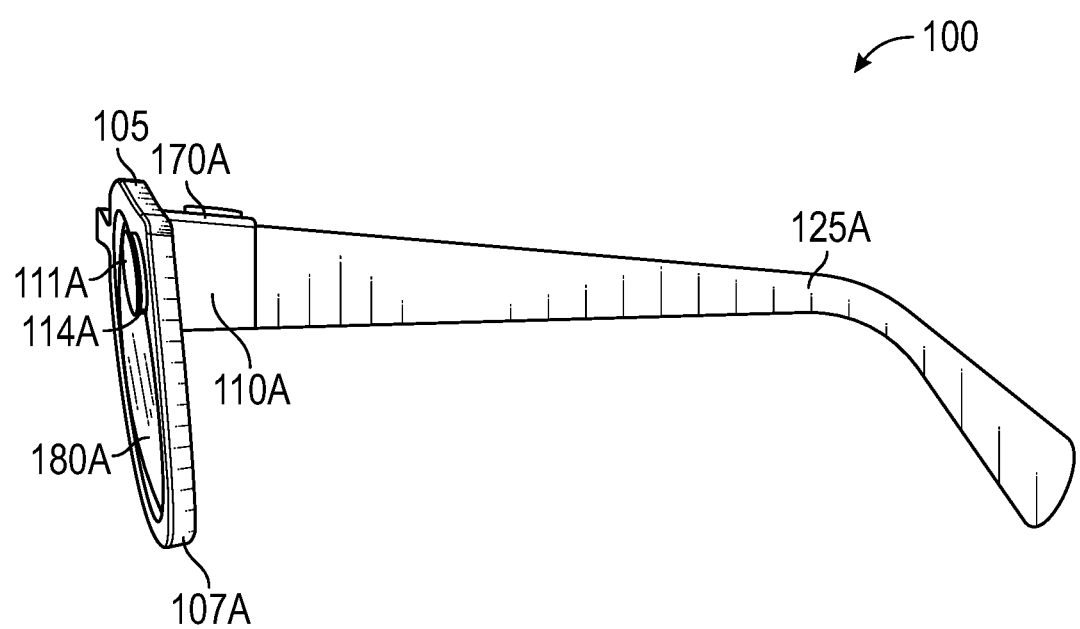
FIG. 1C is a left side view of an example hardware configuration of the eyewear device of FIG. 1A, which shows a left visible-light camera.
Figure 1D:
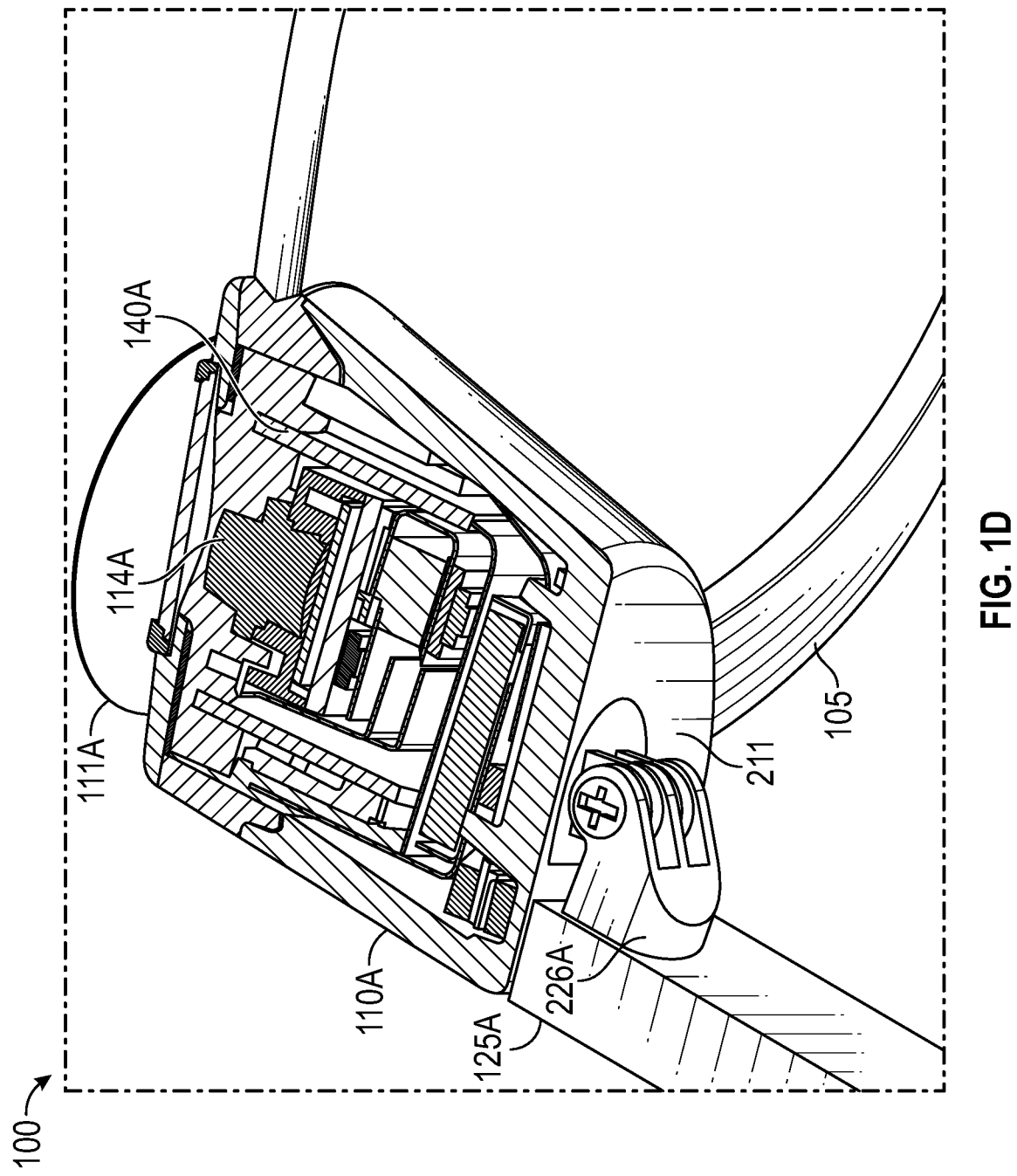
FIG. 1D is a top, partly sectional view of a left chunk of the eyewear device of FIG. 1C depicting the left visible-light camera, and a circuit board.

Eyewear device 100, includes a right optical assembly 180B with an image display to present images, such as depth images. As shown in FIGS. 1A and 1B, the eyewear device 100 includes the right visible-light camera 114B. Eyewear device 100 can include multiple visible-light cameras 114A, 114B that form a passive type of three-dimensional camera, such as stereo camera, of which the right visible-light camera 114B is located on a right chunk 110B. As shown in FIGS. 1C-D, the eyewear device 100 also includes a left visible-light camera 114A.

Left and right visible-light cameras 114A, 114B are sensitive to the visible-light range wavelength. Each of the visible-light cameras 114A, 114B have a different frontward facing field of view which are overlapping to enable generation of three-dimensional depth images, for example, right visible-light camera 114B depicts a right field of view 111B. Generally, a "field of view" is the part of the scene that is visible through the camera at a particular position and orientation in space. The fields of view 111A and 111B have an overlapping field of view 813. Objects or object features outside the field of view 111A, 111B when the visible-light camera captures the image are not recorded in a raw image (e.g., photograph or picture). The field of view describes an angle range or extent, which the image sensor of the visible-light camera 114A, 114B picks up electromagnetic radiation of a given scene in a captured image of the given scene. Field of view can be expressed as the angular size of the view cone, i.e., an angle of view. The angle of view can be measured horizontally, vertically, or diagonally.

In an example, visible-light cameras 114A, 114B have a field of view with an angle of view between 15° to 110°, for example 24°, and have a resolution of 480×480 pixels or greater. The "angle of coverage" describes the angle range that a lens of visible-light cameras 114A, 114B or infrared camera 220 (see FIG. 2A) can effectively image. Typically, the camera lens produces an image circle that is large enough to cover the film or sensor of the camera completely, possibly including some vignetting toward the edge. If the angle of coverage of the camera lens does not fill the sensor, the image circle will be visible, typically with strong vignetting toward the edge, and the effective angle of view will be limited to the angle of coverage.

Examples of such visible-lights camera 114A, 114B include a high-resolution complementary metal-oxide-semiconductor (CMOS) image sensor and a video graphic array (VGA) camera, such as 640p (e.g., 640×480 pixels for a total of 0.3 megapixels), 720p, or 1080p (or greater).

The eyewear device 100 may capture image sensor data from the visible-light cameras 114A, 114B along with geolocation data, digitized by an image processor, for storage in a memory. The left and right raw images captured by respective visible-light cameras 114A, 114B are in the two-dimensional space domain and comprise a matrix of pixels on a two-dimensional coordinate system that includes an X-axis for horizontal position and a Y-axis for vertical position. Each pixel includes a color attribute value (e.g., a red pixel light value, a green pixel light value, a blue pixel light value, or a combination thereof); and a position attribute (e.g., an X location coordinate and a Y location coordinate).

In order to capture stereo images for later display as a three-dimensional projection, the image processor 912 (shown in FIG. 4) may be coupled to the visible-light cameras 114A, 114B to receive and store the visual image information. A timestamp for each image may be added by the image processor 912 or another processor which controls operation of the visible-light cameras 114A, 114B, which act as a stereo camera to simulate human binocular vision. The timestamp on each pair of images allows the images to be displayed together as part of a three-dimensional projection. Three-dimensional projections produce an immersive, life-like experience that is desirable in a variety of contexts, including virtual reality (VR) and video gaming.

FIG. 3 is a diagrammatic depiction of a three-dimensional scene 715, a left raw image 858A captured by a left visible-light camera 114A, and a right raw image 858B captured by a right visible-light camera 114B. The left field of view 111A may overlap, as shown, with the right field of view 111B. The overlapping field of view 813 represents that portion of the image captured by both cameras 114A, 114B. The term 'overlapping' when referring to field of view means the matrix of pixels in the generated raw images overlap by thirty percent (30%) or more. 'Substantially overlapping' means the matrix of pixels in the generated raw images—or in the infrared image of scene—overlap by fifty percent (50%) or more. As described herein, the two raw images 858A, 858B may be processed to include a timestamp, which allows the images to be displayed together as part of a three-dimensional projection.

For the capture of stereo images, as illustrated in FIG. 3, a pair of raw red, green, and blue (RGB) images are captured of a real scene 715 at a given moment in time—a left raw image 858A captured by the left camera 114A and right raw image 858B captured by the right camera 114B. When the pair of raw images 858A, 858B are processed (e.g., by the image processor 912), depth images are generated. The generated depth images may be viewed on an optical assembly 180A, 180B of an eyewear device, on another display (e.g., the image display 880 on a mobile device 890), or on a screen.

The generated depth images are in the three-dimensional space domain and can comprise a matrix of vertices on a three-dimensional location coordinate system that includes an X axis for horizontal position (e.g., length), a Y axis for vertical position (e.g., height), and a Z axis for depth (e.g., distance). Each vertex may include a color attribute (e.g., a red pixel light value, a green pixel light value, a blue pixel light value, or a combination thereof); a position attribute (e.g., an X location coordinate, a Y location coordinate, and a Z location coordinate); a texture attribute, a reflectance attribute, or a combination thereof. The texture attribute quantifies the perceived texture of the depth image, such as the spatial arrangement of color or intensities in a region of vertices of the depth image.

The eyewear device 100 includes a frame 105 and a left temple portion 110A extending from a left lateral side 170A of the frame 105 and a right temple portion 110B extending from a right lateral side 170B of the frame 105. The eyewear device 100 may further include at least two visible-light cameras 114A, 114B which may have overlapping fields of view. In one example, the eyewear device 100 includes a left visible-light camera 114A with a left field of view 111A, as illustrated in FIG. 3. The left camera 114A is connected to the frame 105 or the left temple portion 110A to capture a left raw image 858A from the left side of scene 715. The eyewear device 100 further includes a right visible-light camera 114B with a right field of view 111B. The right camera 114B is connected to the frame 105 or the right temple portion 110B to capture a right raw image 858B from the right side of scene 715.

FIG. 1B is a top cross-sectional view of a right chunk 110B of the eyewear device 100 of FIG. 1A depicting the right visible-light camera 114B of the camera system, and a circuit board. FIG. 1C is a left side view of an example hardware configuration of an eyewear device 100 of FIG. 1A, which shows a left visible-light camera 114A of the camera system. FIG. 1D is a top cross-sectional view of a left chunk 110A of the eyewear device of FIG. 1C depicting the left visible-light camera 114A of the three-dimensional camera, and a circuit board 140A. Construction and placement of the left visible-light camera 114A is substantially similar to the right visible-light camera 114B, except the connections and coupling are on the left lateral side 170A. As shown in the example of FIG. 1B, the eyewear device 100 includes the right visible-light camera 114B and a circuit board, which may be a flexible printed circuit board (PCB) 140B. The right hinge 226B connects the right chunk 110B to a right temple 125B of the eyewear device 100. In some examples, components of the right visible-light camera 114B, the flexible PCB 140B, or other electrical connectors or contacts may be located on the right temple 125B or the right hinge 226B.

The right chunk 110B includes chunk body 211 and a chunk cap, with the chunk cap omitted in the cross-section of FIG. 1B. Disposed inside the right chunk 110B are various interconnected circuit boards, such as PCBs or flexible PCBs, that include controller circuits for right visible-light camera 114B, microphone(s), low-power wireless circuitry (e.g., for wireless short range network communication via Bluetooth™), high-speed wireless circuitry (e.g., for wireless local area network communication via WiFi).

The right visible-light camera 114B is coupled to or disposed on the flexible PCB 240 and covered by a visible-light camera cover lens, which is aimed through opening(s) formed in the frame 105. For example, the right rim 107B of the frame 105 is connected to the right chunk 110B and includes the opening(s) for the visible-light camera cover lens. The frame 105 includes a front-facing side configured to face outwards away from the eye of the user. The opening for the visible-light camera cover lens is formed on and through the front-facing side. In the example, the right visible-light camera 114B has an outward-facing field of view 111B with a line of sight or perspective of the right eye of the user of the eyewear device 100. The visible-light camera cover lens can also be adhered to an outward-facing surface of the right chunk 110B in which an opening is formed with an outwards facing angle of coverage, but in a different outwards direction. The coupling can also be indirect via intervening components.

Left (first) visible-light camera 114A is connected to a left image display of left optical assembly 180A to capture a left-eye-viewed scene observed by a wearer of the eyewear device 100 in a left raw image. Right (second) visible-light camera 114B is connected to a right image display of right optical assembly 180B to capture a right-eye-viewed scene observed by the wearer of the eyewear device 100 in a right raw image. The left raw image and the right raw image partially overlap to present a three-dimensional observable space of a generated depth image.

Flexible PCB 140B is disposed inside the right chunk 110B and is coupled to one or more other components housed in the right chunk 110B. Although shown as being formed on the circuit boards of the right chunk 110B, the right visible-light camera 114B can be formed on the circuit boards of the left chunk 110A, the temples 125A, 125B, or frame 105.

Figure 2A:
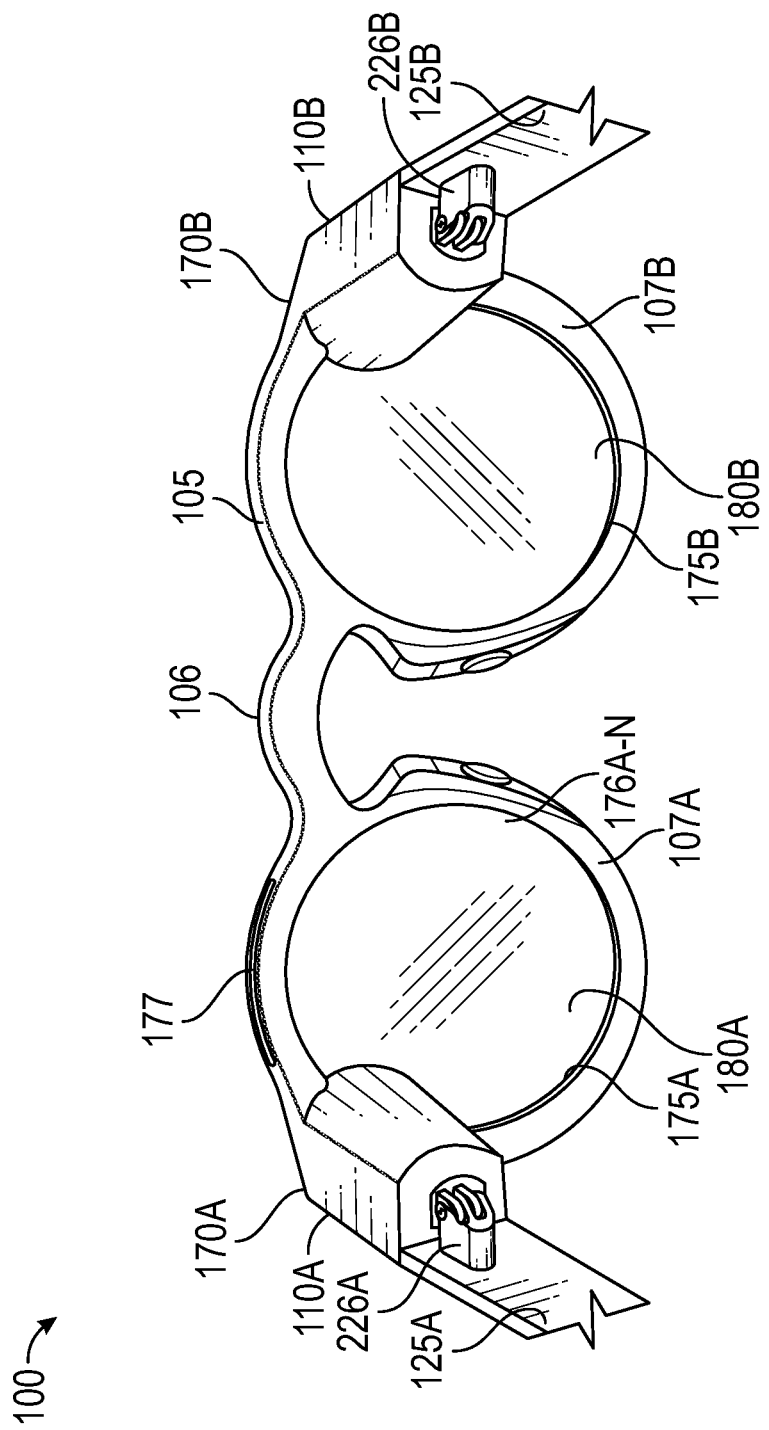
FIGS. 2A and 2B are rear views of example hardware configurations of an eyewear device utilized in the visual content sharing system.
Figure 2B:
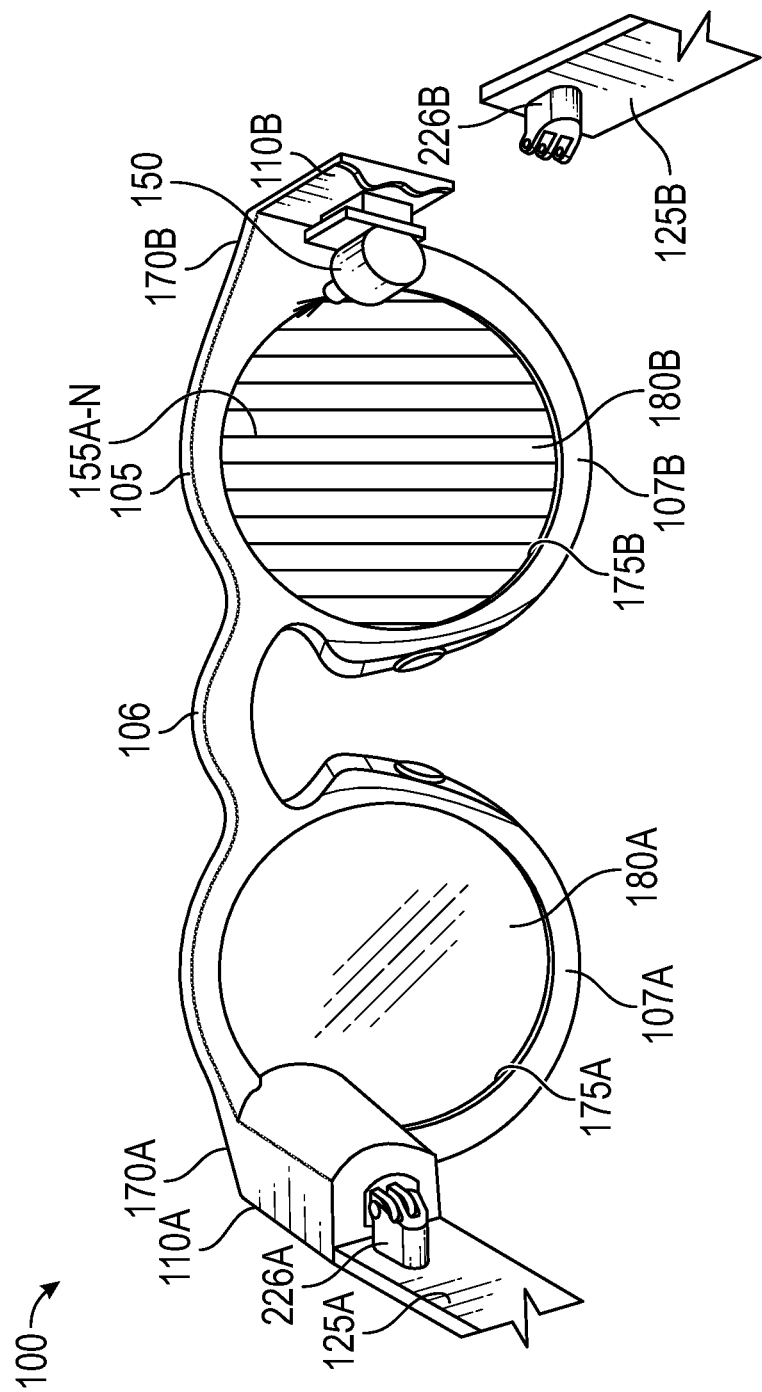

FIGS. 2A and 2B are rear views of example hardware configurations of the eyewear device 100, including two different types of image displays. Eyewear device 100 is in a form configured for wearing by a user, which are eyeglasses in the example. The eyewear device 100 can take other forms and may incorporate other types of frameworks, for example, a headgear, a headset, or a helmet.

In the eyeglasses example, eyewear device 100 includes a frame 105 including a left rim 107A connected to a right rim 107B via a bridge 106 adapted for a nose of the user. The left and right rims 107A, 107B include respective apertures 175A, 175B, which hold a respective optical element 180A, 180B, such as a lens and a display device. As used herein, the term lens is meant to cover transparent or translucent pieces of glass or plastic having curved or flat surfaces that cause light to converge/diverge or that cause little or no convergence or divergence.

Although shown as having two optical elements 180A, 180B, the eyewear device 100 can include other arrangements, such as a single optical element or may not include any optical element 180A, 180B depending on the application or intended user of the eyewear device 100. As further shown, eyewear device 100 includes a left chunk 110A adjacent the left lateral side 170A of the frame 105 and a right chunk 110B adjacent the right lateral side 170B of the frame 105. The chunks 110A, 110B may be integrated into the frame 105 on the respective sides 170A, 170B (as illustrated) or implemented as separate components attached to the frame 105 on the respective sides 170A, 170B. Alternatively, the chunks 110A, 110B may be integrated into temples (not shown) attached to the frame 105.

In one example, the image display of optical assembly 180A, 180B includes an integrated image display. As shown in FIG. 2A, each optical assembly 180A, 180B includes a suitable display matrix 177, such as a liquid crystal display (LCD), an organic light-emitting diode (OLED) display, or any other such display. Each optical assembly 180A, 180B also includes an optical layer or layers 176, which can include lenses, optical coatings, prisms, mirrors, waveguides, optical strips, and other optical components in any combination. The optical layers 176A, 176B, . . . 176N (shown as 176A-N in FIG. 2A and herein) can include a prism having a suitable size and configuration and including a first surface for receiving light from a display matrix and a second surface for emitting light to the eye of the user. The prism of the optical layers 176A-N extends over all or at least a portion of the respective apertures 175A, 175B formed in the left and right rims 107A, 107B to permit the user to see the second surface of the prism when the eye of the user is viewing through the corresponding left and right rims 107A, 107B. The first surface of the prism of the optical layers 176A-N faces upwardly from the frame 105 and the display matrix 177 overlies the prism so that photons and light emitted by the display matrix 177 impinge the first surface. The prism is sized and shaped so that the light is refracted within the prism and is directed toward the eye of the user by the second surface of the prism of the optical layers 176A-N. In this regard, the second surface of the prism of the optical layers 176A-N can be convex to direct the light toward the center of the eye. The prism can optionally be sized and shaped to magnify the image projected by the display matrix 177, and the light travels through the prism so that the image viewed from the second surface is larger in one or more dimensions than the image emitted from the display matrix 177.

In one example, the optical layers 176A, 176B, . . . 176N may include an LCD layer that is transparent (keeping the lens open) unless and until a voltage is applied which makes the layer opaque (closing or blocking the lens). The image processor 912 on the eyewear device 100 may execute programming to apply the voltage to the LCD layer in order to produce an active shutter system, making the eyewear device 100 suitable for viewing visual content when displayed as a three-dimensional projection. Technologies other than LCD may be used for the active shutter mode, including other types of reactive layers that are responsive to a voltage or another type of input.

In another example, the image display device of optical assembly 180A, 180B includes a projection image display as shown in FIG. 2B. Each optical assembly 180A, 180B includes a laser projector 150, which is a three-color laser projector using a scanning mirror or galvanometer. During operation, an optical source such as a laser projector 150 is disposed in or on one of the temples 125A, 125B of the eyewear device 100. Optical assembly 180-B includes one or more optical strips 155A, 155B, . . . 155N (shown as 155A-N in FIG. 2B) which are spaced apart across the width of the lens of each optical assembly 180A, 180B, across a depth of the lens between the front surface and the rear surface of the lens, or a combination thereof.

As the photons projected by the laser projector 150 travel across the lens of each optical assembly 180A, 180B, the photons encounter the optical strips 155A-N. When a particular photon encounters a particular optical strip, the photon is either redirected toward the user's eye, or it passes to the next optical strip. A combination of modulation of laser projector 150, and modulation of optical strips, may control specific photons or beams of light. In an example, a processor controls optical strips 155A-N by initiating mechanical, acoustic, or electromagnetic signals. Although shown as having two optical assemblies 180A, 180B, the eyewear device 100 can include other arrangements, such as a single or three optical assemblies, or each optical assembly 180A, 180B may have arranged different arrangement depending on the application or intended user of the eyewear device 100.

As further shown in FIGS. 2A and 2B, eyewear device 100 includes a left chunk 110A adjacent the left lateral side 170A of the frame 105 and a right chunk 110B adjacent the right lateral side 170B of the frame 105. The chunks 110A, 110B may be integrated into the frame 105 on the respective lateral sides 170A, 170B (as illustrated) or implemented as separate components attached to the frame 105 on the respective sides 170A, 170B. Alternatively, the chunks 110A, 110B may be integrated into temples 125A, 125B attached to the frame 105.

In another example, the eyewear device 100 shown in FIG. 2B may include two projectors, a left projector (not shown) and a right projector 150. The left optical assembly 180A may include a left display matrix 177, a left set of optical strips (not shown) which are configured to interact with light from the left projector (not shown) or a combination thereof. Similarly, the right optical assembly 180B may include a right display matrix (not shown), a right set of optical strips 155A, 155B, . . . 155N, which are configured to interact with light from the right projector 150, or a combination thereof. In this example, the eyewear device 100 includes a left display and a right display.

Figure 4:
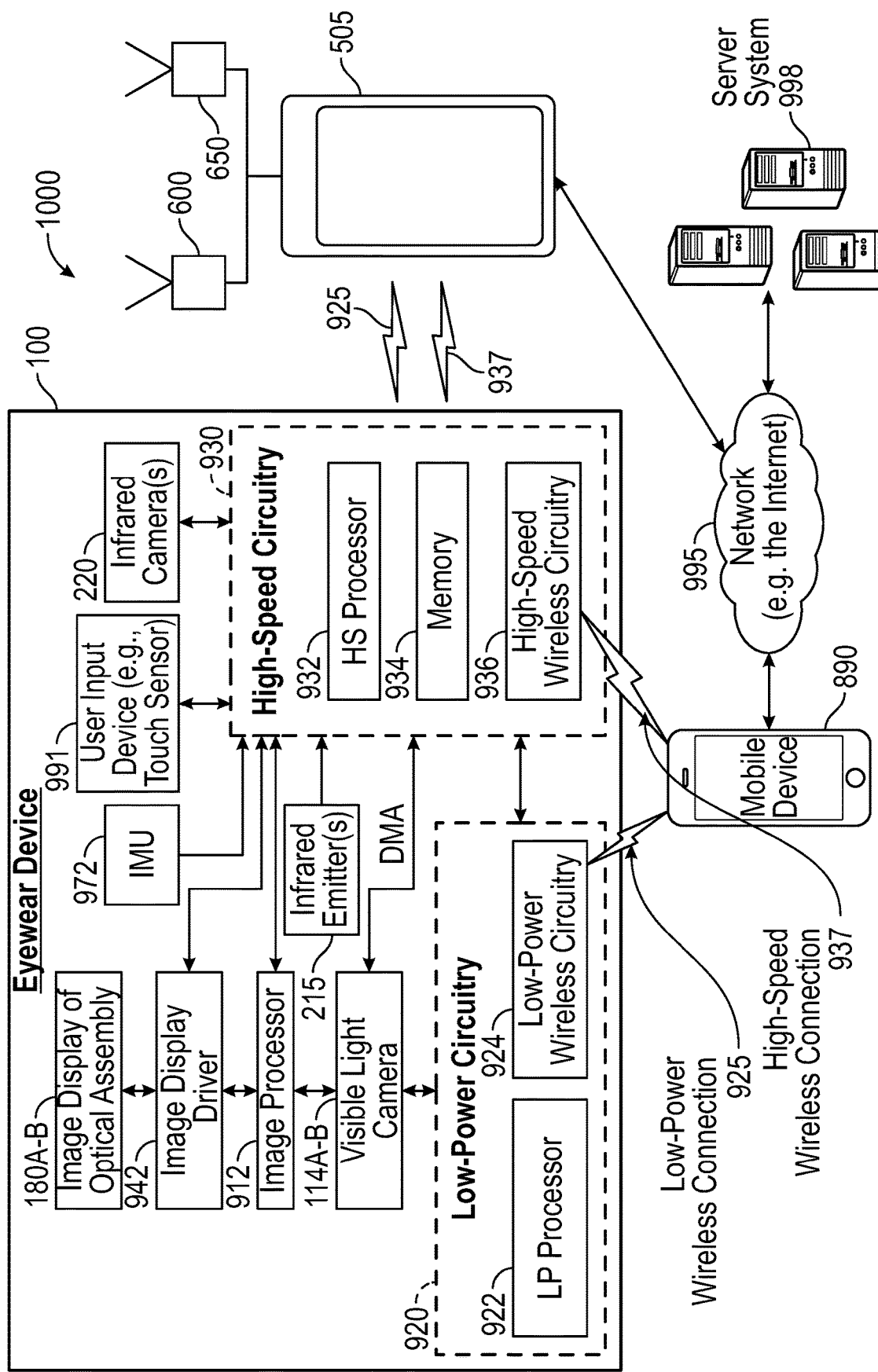
FIG. 4 is a functional block diagram of an example visual content sharing system including an eyewear device, a mobile device, a projector control device, and a server system connected via various networks.

FIG. 4 is a functional block diagram of an example visual content sharing system 1000 including an eyewear device 100, a mobile device 890, a projector control device 505, and a server system 998 connected via various networks 995. The system 1000 includes a low-power wireless connection 925 and a high-speed wireless connection 937 between the eyewear device 100 and a mobile device 890—and also between the eyewear device 100 and a projector control device 505, as shown. Although not shown, the mobile device 890 may connect directly to the projector control device 505 via wireless connection 925, 937. The projector control device 505 may be connected to a first projector 600, a second projector 650, or a combination thereof.

The eyewear device 100 includes one or more visible-light cameras 114A, 114B which together may function as a stereo camera, as described herein. The cameras 114A, 114B may be used to capture initial depth images that may be rendered into three-dimensional (3D) models that are texture-mapped images of a red, green, and blue (RGB) imaged scene. The cameras 114A, 114B may have a direct memory access (DMA) to high-speed circuitry 930. The device 100 may also include a depth sensor comprising infrared emitter(s) 215 and infrared camera(s) 220.

The eyewear device 100 further includes two image displays of each optical assembly 180A, 180B (one associated with the left lateral side 170A and one associated with the right lateral side 170B). The eyewear device 100 also includes an image display driver 942, an image processor 912, low-power circuitry 920, and high-speed circuitry 930. The image displays of each optical assembly 180A, 180B are for presenting images, such as a depth image. The image display driver 942 is coupled to the image displays of each optical assembly 180A, 180B in order to control the images displayed. The eyewear device 100 further includes a user input device 991 (e.g., a touch sensor) to receive a two-dimensional input selection from a user.

The components shown in FIG. 4 for the eyewear device 100 are located on one or more circuit boards, for example a PCB or flexible PCB, located in the rims or temples. Alternatively, or additionally, the depicted components can be located in the chunks, frames, hinges, or bridge of the eyewear device 100. Left and right visible-light cameras 114A, 114B can include digital camera elements such as a complementary metal-oxide-semiconductor (CMOS) image sensor, a charge-coupled device, a lens, or any other respective visible or light capturing elements that may be used to capture data, including images of scenes with unknown objects.

As shown in FIG. 4, high-speed circuitry 930 includes a high-speed processor 932, a memory 934, and high-speed wireless circuitry 936. In the example, the image display driver 942 is coupled to the high-speed circuitry 930 and operated by the high-speed processor 932 in order to drive the left and right image displays of each optical assembly 180A, 180B. High-speed processor 932 may be any processor capable of managing high-speed communications and operation of any general computing system needed for eyewear device 100. High-speed processor 932 includes processing resources needed for managing high-speed data transfers on high-speed wireless connection 937 to a wireless local area network (WLAN) using high-speed wireless circuitry 936. In certain examples, the high-speed processor 932 executes an operating system such as a LINUX operating system or other such operating system of the eyewear device 100 and the operating system is stored in memory 934 for execution. In addition to any other responsibilities, the high-speed processor 932 executes a software architecture for the eyewear device 100 that is used to manage data transfers with high-speed wireless circuitry 936. In certain examples, high-speed wireless circuitry 936 is configured to implement Institute of Electrical and Electronic Engineers (IEEE) 802.11 communication standards, also referred to herein as Wi-Fi. In other examples, other high-speed communications standards may be implemented by high-speed wireless circuitry 936.

The low-power circuitry 920 includes a low-power processor 922 and low-power wireless circuitry 924. The low-power wireless circuitry 924 and the high-speed wireless circuitry 936 of the eyewear device 100 can include short range transceivers (Bluetooth™) and wireless wide, local, or wide-area network transceivers (e.g., cellular or WiFi). Mobile device 890, including the transceivers communicating via the low-power wireless connection 925 and the high-speed wireless connection 937, may be implemented using details of the architecture of the eyewear device 100, as can other elements of the network 995.

Memory 934 includes any storage device capable of storing various data and applications, including, among other things, camera data generated by the left and right visible-light cameras 114A, 114B, the infrared camera(s) 220, and the image processor 912, as well as images generated for display by the image display driver 942 on the image displays of each optical assembly 180A, 180B. Although the memory 934 is shown as integrated with high-speed circuitry 930, the memory 934 in other examples may be an independent, standalone element of the eyewear device 100. In certain such examples, electrical routing lines may provide a connection through a chip that includes the high-speed processor 932 from the image processor 912 or low-power processor 922 to the memory 934. In other examples, the high-speed processor 932 may manage addressing of memory 934 such that the low-power processor 922 will boot the high-speed processor 932 any time that a read or write operation involving memory 934 is needed.

Figure 5:
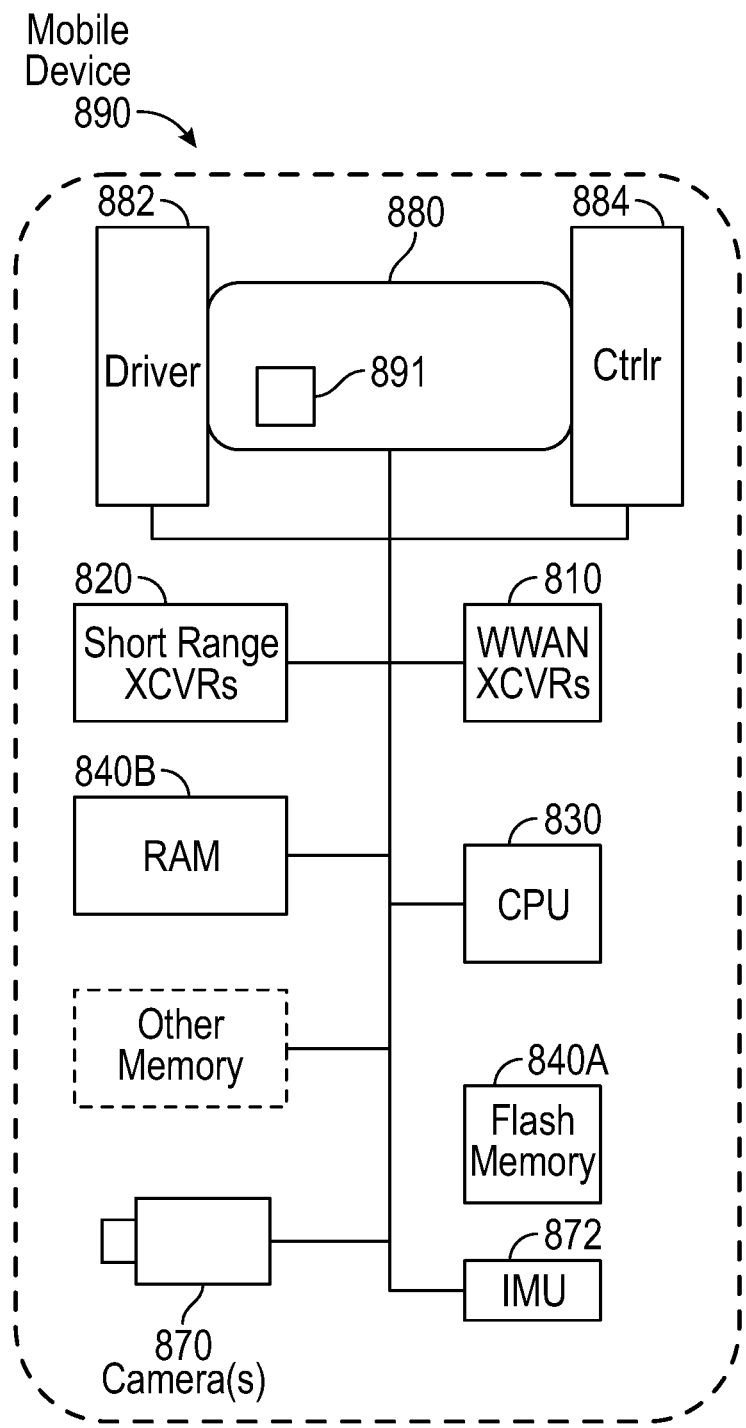
FIG. 5 is a diagrammatic representation of an example hardware configuration for a mobile device of the visual content sharing system of FIG. 3.

As shown in FIG. 4, the high-speed processor 932 of the eyewear device 100 can be coupled to the camera system (visible-light cameras 114A, 114B), the image display driver 942, the user input device 991, and the memory 934. As shown in FIG. 5, the CPU 830 of the mobile device 890 may be coupled to a camera system 870, a mobile display driver 882, a user input layer 891, and a memory 840A.

Server system 998 may be one or more computing devices as part of a service or network computing system, for example, that include a processor, a memory, and network communication interface to communicate over the network 995 with an eyewear device 100, a mobile device 890, and a projector control device 505.

Output components of the eyewear device 100 include visual elements, such as the left and right image displays of each optical assembly 180A, 180B as described in FIGS. 2A and 2B (e.g., a display such as a liquid crystal display (LCD), a plasma display panel (PDP), a light emitting diode (LED) display, a projector, or a waveguide). The image displays of each optical assembly 180A, 180B are driven by the image display driver 942. The output components of the eyewear device 100 further include acoustic components (e.g., speakers), haptic components (e.g., a vibratory motor), other signal generators, and so forth. The input components of the eyewear device 100, the mobile device 890, and the server system 998, may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

Eyewear device 100 may optionally include additional peripheral device elements. Such peripheral device elements may include biometric sensors, additional sensors, or display elements integrated with eyewear device 100. For example, peripheral device elements may include any I/O components including output components, motion components, position components, or any other such elements described herein.

For example, the biometric components include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The inertial measurement unit 972 includes any of a variety of motion-sensing components such as acceleration sensors (e.g., accelerometer), gravity sensors, rotation sensors (e.g., gyroscopes), and so forth. The position components include location sensor components to generate location coordinates (e.g., a Global Positioning System (GPS) receiver component), WiFi or Bluetooth™ transceivers to generate positioning system coordinates, altitude sensor components (e.g., altimeters or barometers that detect air pressure from which altitude may be derived), orientation sensor components (e.g., magnetometers), and the like. Such positioning system coordinates can also be received over the wireless connections 925, 937 from the mobile device 890 via the low-power wireless circuitry 924 or the high-speed wireless circuitry 936.

Mobile device 890 may be a smartphone, tablet, laptop computer, access point, or any other such device capable of connecting with eyewear device 100 using both a low-power wireless connection 925 and a high-speed wireless connection 937. Mobile device 890 is connected to server system 998 and network 995. The network 995 may include any combination of wired and wireless connections.

FIG. 5 is a high-level functional block diagram of an example mobile device 890. Mobile device 890 includes a flash memory 840A which includes programming to perform all or a subset of the functions described herein. Mobile device 890 may include a camera 870 that comprises at least two visible-light cameras (first and second visible-light cameras with overlapping fields of view) or at least one visible-light camera and a depth sensor with substantially overlapping fields of view. Flash memory 840A may further include multiple images or video, which are generated via the camera 870.

As shown, the mobile device 890 includes an image display 880, an IMU 872, a mobile display driver 882 to control the image display 880, and a controller 884. In the example of FIG. 4, the image display 880 includes a user input layer 891 (e.g., a touchscreen) that is layered on top of or otherwise integrated into the screen used by the image display 880.

Examples of touchscreen-type mobile devices that may be used include (but are not limited to) a smart phone, a personal digital assistant (PDA), a tablet computer, a laptop computer, or other portable device. However, the structure and operation of the touchscreen-type devices is provided by way of example; the subject technology as described herein is not intended to be limited thereto. For purposes of this discussion, FIG. 4 therefore provides a block diagram illustration of the example mobile device 890 with a user interface that includes a touchscreen input layer 891 for receiving input (by touch, multi-touch, or gesture, and the like, by hand, stylus or other tool) and an image display 880 for displaying content As shown in FIG. 4, the mobile device 890 includes at least one digital transceiver (XCVR) 810, shown as WWAN XCVRs, for digital wireless communications via a wide-area wireless mobile communication network. The mobile device 890 also includes additional digital or analog transceivers, such as short range XCVRs 820 for short-range network communication, such as via NFC, VLC, DECT, ZigBee, Bluetooth™, or WiFi. For example, short range XCVRs 820 may take the form of any available two-way wireless local area network (WLAN) transceiver of a type that is compatible with one or more standard protocols of communication implemented in wireless local area networks, such as one of the Wi-Fi standards under IEEE 802.11.

To generate location coordinates for positioning of the mobile device 890, the mobile device 890 can include a global positioning system (GPS) receiver. Alternatively, or additionally the mobile device 890 can utilize either or both the short range XCVRs 820 and WWAN XCVRs 810 for generating location coordinates for positioning. For example, cellular network, WiFi, or Bluetooth™ based positioning systems can generate very accurate location coordinates, particularly when used in combination. Such location coordinates can be transmitted to the eyewear device over one or more network connections via XCVRs 810, 820.

The transceivers 810, 820 (i.e., the network communication interface) conforms to one or more of the various digital wireless communication standards utilized by modern mobile networks. Examples of WWAN transceivers 810 include (but are not limited to) transceivers configured to operate in accordance with Code Division Multiple Access (CDMA) and 3rd Generation Partnership Project (3GPP) network technologies including, for example and without limitation, 3GPP type 2 (or 3GPP2) and LTE, at times referred to as "4G." For example, the transceivers 810, 820 provide two-way wireless communication of information including digitized audio signals, still image and video signals, web page information for display as well as web-related inputs, and various types of mobile message communications to/from the mobile device 890.

The mobile device 890 further includes a microprocessor that functions as a central processing unit (CPU); shown as CPU 830 in FIG. 4. A processor is a circuit having elements structured and arranged to perform one or more processing functions, typically various data processing functions. Although discrete logic components could be used, the examples utilize components forming a programmable CPU. A microprocessor for example includes one or more integrated circuit (IC) chips incorporating the electronic elements to perform the functions of the CPU. The CPU 830, for example, may be based on any known or available microprocessor architecture, such as a Reduced Instruction Set Computing (RISC) using an ARM architecture, as commonly used today in mobile devices and other portable electronic devices. Of course, other arrangements of processor circuitry may be used to form the CPU 830 or processor hardware in smartphone, laptop computer, and tablet.

The CPU 830 serves as a programmable host controller for the mobile device 890 by configuring the mobile device 890 to perform various operations, for example, in accordance with instructions or programming executable by CPU 830. For example, such operations may include various general operations of the mobile device, as well as operations related to the programming for applications on the mobile device. Although a processor may be configured by use of hardwired logic, typical processors in mobile devices are general processing circuits configured by execution of programming.

The mobile device 890 includes a memory or storage system, for storing programming and data. In the example, the memory system may include a flash memory 840A, a random-access memory (RAM) 840B, and other memory components, as needed. The RAM 840B serves as short-term storage for instructions and data being handled by the CPU 830, e.g., as a working data processing memory. The flash memory 840A typically provides longer-term storage.

Hence, in the example of mobile device 890, the flash memory 840A is used to store programming or instructions for execution by the CPU 830. Depending on the type of device, the mobile device 890 stores and runs a mobile operating system through which specific applications are executed. Examples of mobile operating systems include Google Android, Apple iOS (for iPhone or iPad devices), Windows Mobile, Amazon Fire OS, RIM BlackBerry OS, or the like.

Figure 6:
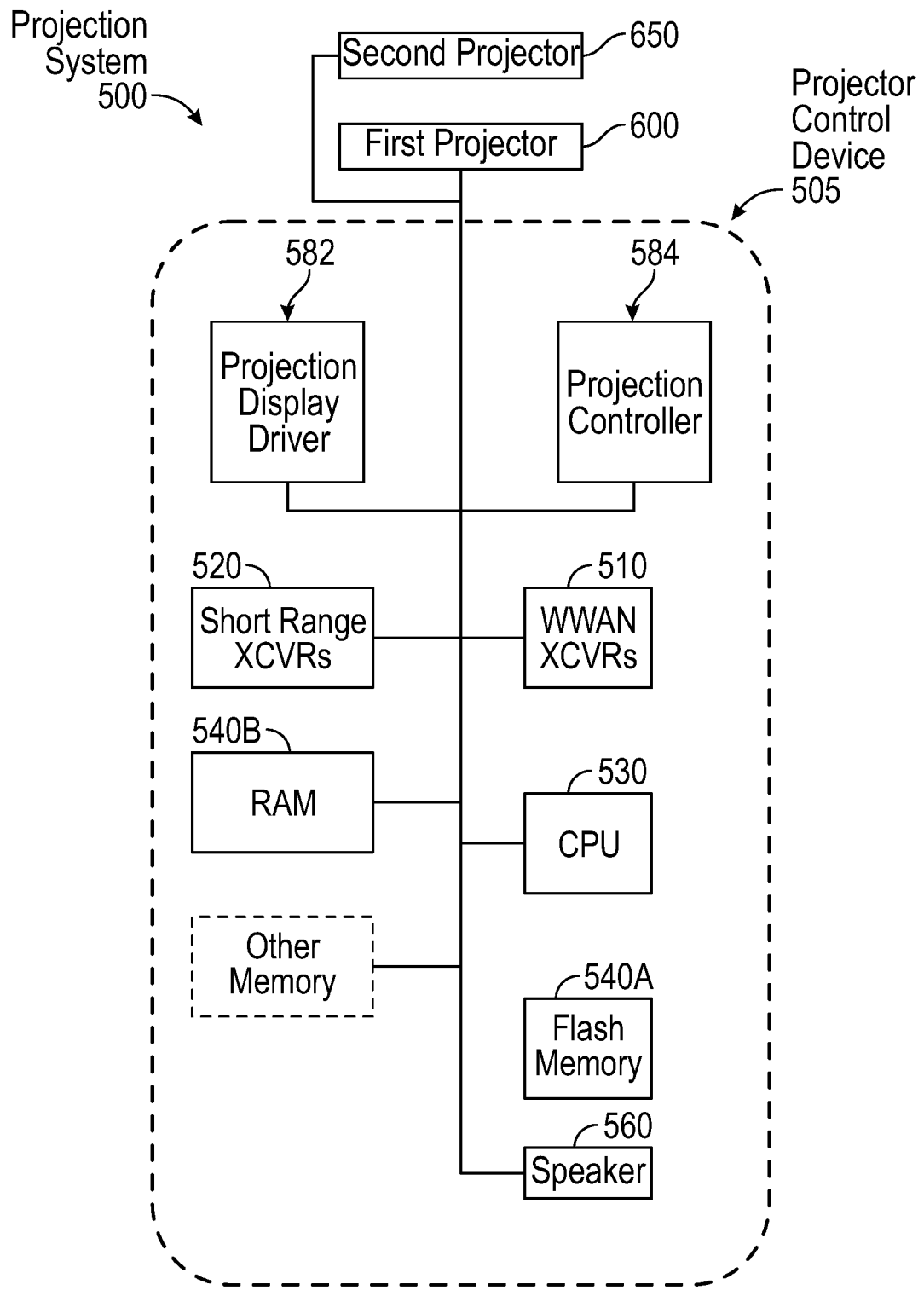
FIG. 6 is a diagrammatic representation of an example hardware configuration for a projector control device of the visual content sharing system of FIG. 3.

FIG. 6 is a high-level functional block diagram of an example projection system 500, which includes a projector control device 505 and at least a first projector 600. As described herein, the system 500 may include a second projector 650.

The projector control device 505, as shown, includes a projection display driver 582, a projection controller 584, a processor 530, one or more memory elements, 540A, 540B, and a network communications interface that may include a wide-area transceiver 510 and a short-range transceiver 520. The projection display driver 582 and the projection controller 584 interface with a first projector 600 to control the content to be projected.

The projector control device 505 further includes a speaker 560 for playing the audio component, if any, associated with the visual content to be projected. If the projector 600 includes a speaker, then the device speaker 560 may be configured to cooperate with the projector 600 and provide supplemental sound.

The projector control device 505 includes at least one long-range, digital transceiver 510, shown as WWAN XCVRs on FIG. 6, that is configured for digital wireless communications via a wireless wide-area network (WWAN). The projector control device 505 also includes additional digital or analog transceivers, such as short-range transceiver(s) 520 that is configured for short-range network communication, such as via NFC, VLC, DECT, ZigBee, Bluetooth™, or WiFi. The short-range transceiver(s) 520 may take the form of any available two-way wireless local area network (WLAN) transceiver of a type that is compatible with one or more standard protocols of communication implemented in wireless local area networks, such as one of the Wi-Fi standards under IEEE 802.11.

The projector control device 505 may also include a global positioning system (GPS) receiver. Alternatively, or additionally, the projector control device 505 can utilize either or both the short-range transceiver(s) 520 or the wide-area transceiver(s) 510 for generating location coordinates for positioning. For example, cellular network, WiFi, or Bluetooth™ based positioning systems can generate very accurate location coordinates, particularly when used in combination. Such location coordinates can be transmitted to one or more eyewear devices, and to one or more mobile devices 890, over one or more network connections via the transceiver(s) 510, 520.

The transceivers 510, 520 (i.e., the network communication interface) conforms to one or more of the various digital wireless communication standards utilized by modern mobile networks. Examples of WWAN transceivers 510 include but are not limited to transceivers configured to operate in accordance with Code Division Multiple Access (CDMA) and 3rd Generation Partnership Project (3GPP) network technologies including, for example and without limitation, 3GPP type 2 (or 3GPP2) and LTE, at times referred to as "4G." For example, the transceivers 510, 520 provide two-way wireless communication of information including digitized audio signals, still image and video signals, web page information for display as well as web-related inputs, and various types of mobile message communications to or from the projector control device 505.

The projector control device 505 further includes a microprocessor 530 that functions as a central processing unit (CPU) for the device 505 (shown as CPU 530 in FIG. 6). A processor is a circuit having elements structured and arranged to perform one or more processing functions, typically various data processing functions. Although discrete logic components could be used, the examples utilize components forming a programmable CPU. A microprocessor for example includes one or more integrated circuit (IC) chips incorporating the electronic elements to perform the functions of the microprocessor. The microprocessor 530, for example, may be based on any known or available microprocessor architecture, such as a Reduced Instruction Set Computing (RISC) using an ARM architecture, as commonly used today in mobile devices and other portable electronic devices. Of course, other arrangements of processor circuitry may be used to form the microprocessor 530 or processor hardware in smartphone, laptop computer, and tablet.

The microprocessor 530 serves as a programmable host controller for the projector control device 505 by configuring the device 505 to perform various operations; for example, in accordance with instructions or programming executable by the microprocessor 530. For example, such operations may include various general operations of the projector control device 505, as well as operations related to the programming for applications that reside on the projector control device 505. Although a processor may be configured by use of hardwired logic, typical processors in mobile devices are general processing circuits configured by execution of programming.

The projector control device 505 includes one or more memory elements 540A, 540B for storing programming and data. In the example shown in FIG. 6, the memory elements include a flash memory 540A, a random-access memory (RAM) 540B, and other memory elements, as needed. The flash memory 540A stores the programming and instructions needed to perform all or a subset of the functions described herein. The RAM 540B operates as short-term storage for instructions and data being handled by the microprocessor 530. Depending on the particular type of device, the projector control device 505 stores and runs an operating system through which specific applications are executed.

The operating system may be a mobile operating system, such as Google Android, Apple iOS, Windows Mobile, Amazon Fire OS, RIM BlackBerry OS, or the like.

In some example configurations, some or all the elements of the projector control device 505 are integrated with or part of a projector 600. In this aspect, the projector 600 itself may operate as the projector control device 505.

Figure 7:
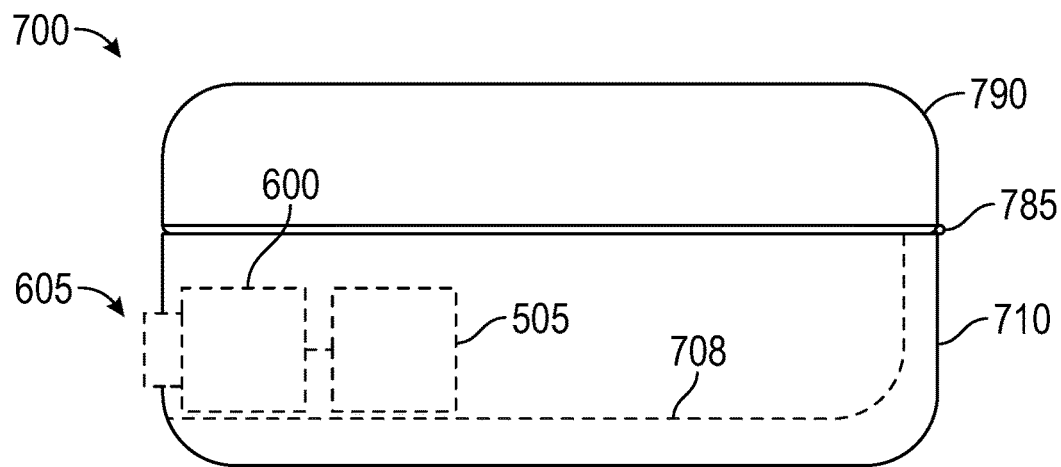
FIG. 7 is a schematic illustration of an example hardware configuration for a projector control device and a projector in a housing.

FIG. 7 is a schematic illustration of an example hardware configuration for a projector control device 505 and a projector 600 in a housing 700. The projector 600 includes a lens 605 positioned in an exterior wall of the housing 700. The projector 600 and the projector control device 505 may be positioned on an interior floor 708 inside the housing 700. The housing 700 may include a base 710 and a lid 790 connected by a hinge 785, as shown.

In another example configuration, the housing 700 is an eyeglasses case that is sized and shaped to hold eyewear device 100, a projector 600, and a control device 505. The eyeglasses case may include a power supply, charging system, or both. For the eyewear device 100, the charging system includes an interior charging plug that is sized and shaped to interface with a matching socket located on the eyewear device 100. Also, the interior charging plug may be connected to an exterior charging port, to which a charging cord may be attached (for powering or re-charging the battery on the eyewear device 100). In some configurations, the projector 600 and the projector control device 505 are also connected to the charging system.

In an alternative configuration, the housing 700 is separate from the eyeglasses case that holds the eyewear device 100. The housing 700 may include its own charging system for the projector control device 505 and the projector 600 which operates independently of any charging system in the eyeglasses case. In some configurations, the housing 700 may be sized and shaped to releasably attach, snap into, or otherwise engage with an eyeglasses case, either on the inside or the outside. The attachment may include a connection to the charging system in the eyeglasses case. The attachment may be selectively releasable, such that the housing 700 can be detached from the eyeglasses case; for example, to position the housing 700 (and the projector 600) at a location remote from the eyeglasses case.

Figure 8:
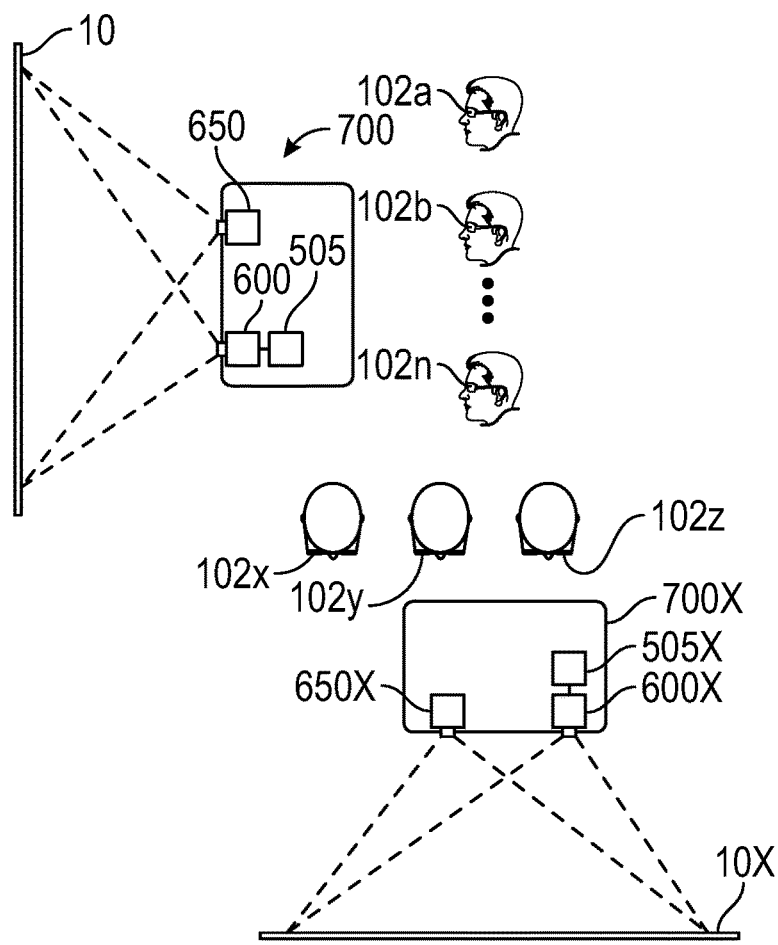
FIG. 8 is a plan-view, schematic illustration of an example configuration of the visual content sharing system of FIG. 3.

FIG. 8 is a plan-view, schematic illustration of an example configuration of the visual content sharing system 1000 as described herein. The housing 700, as shown, supports a projector 600, a projector control device 505, and a second projector 650. As described herein, projecting the two images for viewing in 3D can be accomplished by a single projector or by a pair of dual projectors. In a dual projector configuration, the left projector (projector 600) displays the left channel image; the right projector (second projector 650) displays the right channel image. The projectors 600, 650 cooperate to project a three-dimensional display onto a screen 10 for viewing with 3D-capable glasses. A plurality of second eyewear devices 102a, 102b, ... 102n are worn by users who are watching the display on the screen 10. The first eyewear device 100 which captured the visual content may also be configured to watch the display on the screen 10.

The visual content sharing system 1000 described herein may include a number of eyewear devices 100 (and mobile device 890) in communication with a number of projector control devices 505 and projectors. A number of projector control devices 505 may be controlled so that each projector displays the same visual content at the same time. The example configuration shown in FIG. 8 includes an auxiliary housing 700X supporting an auxiliary projector 600X, an auxiliary projector control device 505X, and an auxiliary second projector 650X. A plurality of auxiliary second eyewear devices 102x, 102y, ... 102z are worn by users who are watching the display on the auxiliary screen 10X. In this aspect, the visual content sharing system 1000 can be used to project a three-dimensional display onto a number of screens simultaneously for a number of users who are wearing second eyewear devices.

The visual content sharing system 1000 in some example configurations can be implemented by one or more computer program instructions stored in a memory and executed by a processor. The instructions can be divided into separate modules or subsets, tailored for execution by the processor on a particular device, while working as a whole to accomplish the steps in the system 1000. Any of the processors on the devices 100, 890, 505 can be configured to execute the instructions, modules, or subsets. In this aspect, each device 100, 890, 505 in the system can act as a host computing device.

Figure 9:
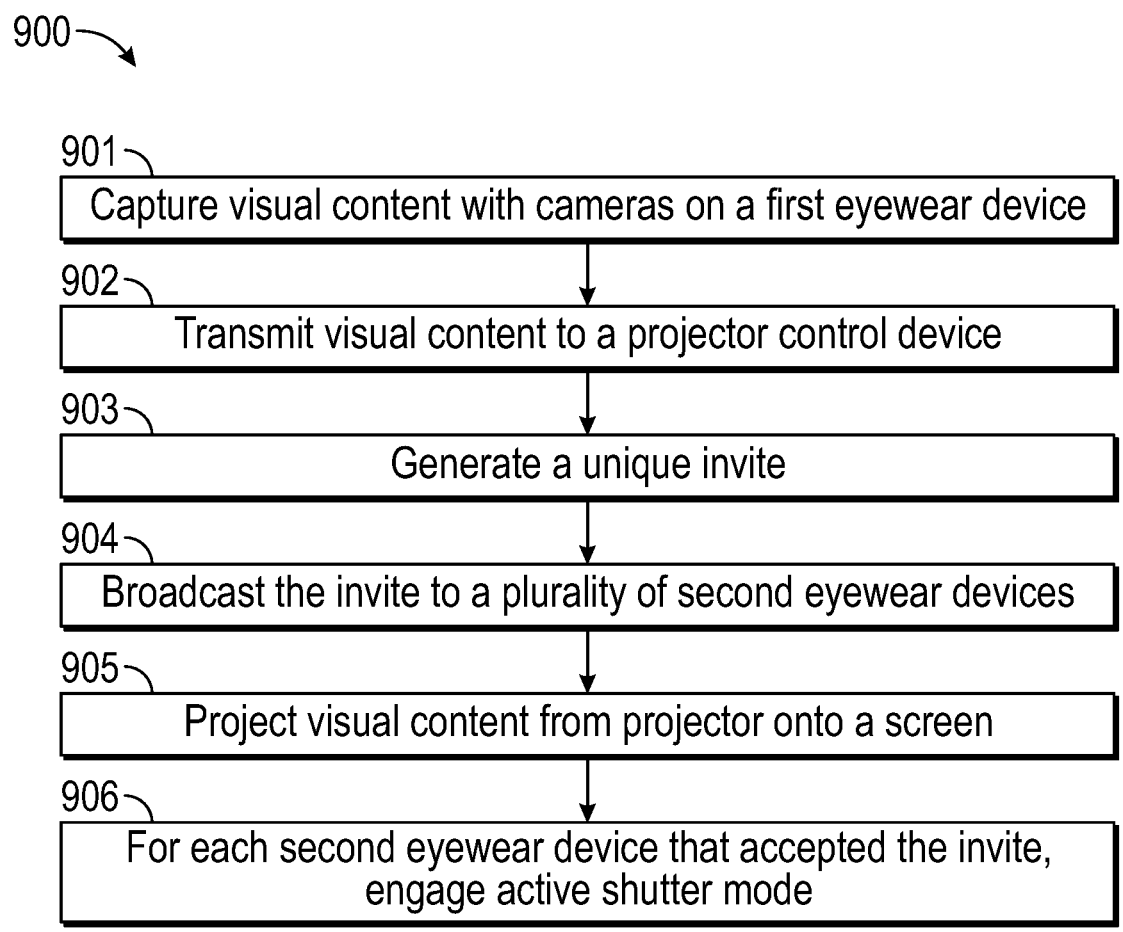
FIG. 9 is a flow chart of an example method of imaging sharing.

FIG. 9 is a flow chart of an example method of imaging sharing, including steps that can be implemented in an imaging sharing system. To facilitate understanding, the steps in the method 900 are described with reference to the systems and hardware described herein. One of skill in the art will recognize other suitable systems for performing the steps described herein.

At step 901, capture the visual content. The eyewear device 100 captures visual content using its visible-light cameras 114A, 114B as described herein. The programming instructions for step 901 may be stored in memory 934 and executed by the high-speed processor 392 on the eyewear device 100. The visual content is captured (photographed), processed by the image processor 912 to the extent necessary (to apply a timestamp to each pair of raw images, for example), and then saved (optionally) in the memory 934.

At step 902, transmit the visual content from the eyewear device 100 to a projector control device 505 via the low-power wireless connection 925 or the high-speed wireless connection 937. The programming instructions for step 902 may be stored in memory 934 and executed by the high-speed processor 392 on the eyewear device 100.

Alternatively, the eyewear device 100 may transmit the visual content to a mobile device 890 first, and then perhaps to the server system 998, and then finally to a projector control device 505. Such a relay would be useful in situations where the projector control device 505 is located far away from the eyewear device 100 (or far from the mobile device 890). For this alternative, the programming instructions for step 902 may be stored in one or multiple memory locations (memory 934 on the eyewear device 100, flash memory 840A on the mobile device 890, or in a memory on the server system 998) and executed by one or multiple processors in the system 1000.

At step 903, generate a unique invite associated with the visual content. Upon receiving the visual content, the projector control device 505 can generate an invite that includes a code or identifier associated with the specific visual content that is ready for display, a means for accepting the invite on a user interface, and one or more related instructions. The invite is described as unique because each one is only associated with a particular item of visual content. The programming instructions for step 903 may be stored in memory 540A and executed by the microprocessor 530 on the projector control device 505. Alternatively, the programming instructions for step 903 may be stored in one or multiple memory locations (memory 934 on the eyewear device 100, flash memory 840A on the mobile device 890, or in a memory on the server system 998) and executed by one or multiple processors in the system 1000.

At step 904, broadcast the invite. The projector control device 505 can broadcast the unique invite using one or both of its wireless transceivers 510, 520. The invite can be broadcast to a plurality of eyewear devices, referred to herein as second eyewear devices 102. The invite may include one or more message elements, such as a start time for the projection, a viewing window, a viewing location, an instruction to begin active shutter mode during the viewing, a list of IP addresses associated with particular mobile devices that are authorized to receive the invite, a limited geographical area in which the invite is valid, a query to determine if an eyewear device is sufficiently equipped to view the content, an expiration time for the invite, and other such elements. The projector control device 505 can be the only source of the broadcast, or the broadcasting task may be shared between and among any equipped device 100, 890, 998 in the visual content sharing system 1000. The programming instructions for step 904 may be stored in memory 540A and executed by the microprocessor 530 on the projector control device 505. Alternatively, the programming instructions for step 904 may be stored in one or multiple memory locations (memory 934 on the eyewear device 100, flash memory 840A on the mobile device 890, or in a memory on the server system 998) and executed by one or multiple processors in the system 1000.

At step 905, project the visual content. The projector control device 505 directs the projector 600, either alone of with a second projector 650, to project the visual content in three-dimensional display on a screen. The projection step may be synchronized with one or more projector control devices 505 to display the content simultaneously; alternatively, each control device 505 may operate independently. The projection step may be executed at a time certain or suspended until certain conditions are true. These conditions may include whether a threshold number of second eyewear devices 102 have accepted the unique invite, whether one or more particular devices 102 have accepted, whether a number or kind of devices 102 are located in the vicinity of a screen or have engaged active shutter mode, and the like. These conditions may be part of the unique invite when broadcast, or the conditions may be tested or otherwise sensed by the projector control device 505 locally. The programming instructions for step 905 may be stored in memory 540A and executed by the microprocessor 530 on the projector control device 505.

At step 906, engage active shutter mode. For visual content that includes a three-dimensional display, the second eyewear devices 102 which accept the unique invite will need to engage active shutter mode in order to view the content. Active shutter mode can start at or about the same time as the projection step 906 starts. Active shutter mode can be initiated and controlled locally by the image processor 912 on each eyewear device. The user can initiate active shutter mode by using or the user input device 991 on the eyewear device 100, or by entering a command on the mobile device 890. The programming instructions can be used to initiate active shutter mode when certain conditions are true, such as the time when the projection begins. Other conditions for initiating active shutter mode may be set in message elements that are part of the unique invite or set locally by the projector control device 505.

Any of the visual content sharing functionality described herein for the eyewear device 100, mobile device 890, projector control device 505, and server system 998 can be embodied in one more applications or sets of programming instructions, as described herein. According to some examples, "function," "functions," "application," "applications," "instruction," "instructions," or "programming" are program(s) that execute functions defined in the programs. Various programming languages can be employed to produce one or more of the applications, structured in a variety of manners, such as object-oriented programming languages (e.g., Objective-C, Java, or C++) or procedural programming languages (e.g., C or assembly language). In a specific example, a third-party application (e.g., an application developed using the ANDROID™ or IOS™ software development kit (SDK) by an entity other than the vendor of the particular platform) may include mobile software running on a mobile operating system such as IOS™ ANDROID™, WINDOWS® Phone, or another mobile operating systems. In this example, the third-party application can invoke API calls provided by the operating system to facilitate functionality described herein.

Hence, a machine-readable medium may take many forms of tangible storage medium. Non-volatile storage media include, for example, optical or magnetic disks, such as any of the storage devices in any computer devices or the like, such as may be used to implement the client device, media gateway, transcoder, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code or data. Many of these forms of computer readable media may be involved in carrying one or more sequences of one or more instructions to a processor for execution.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. Such amounts are intended to have a reasonable range that is consistent with the functions to which they relate and with what is customary in the art to which they pertain. For example, unless expressly stated otherwise, a parameter value or the like may vary by as much as ±10% from the stated amount.

In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, the subject matter to be protected lies in less than all features of any single disclosed example. Thus, the following claims are hereby incorporated into the Detailed Description, with each claim standing on its own as a separately claimed subject matter.

While the foregoing has described what are considered to be the best mode and other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. A method of sharing content using a projector and an eyewear device comprising a processor, a stereo camera, and a wireless transceiver, the method comprising the steps of:
   providing a housing defining an interior sized and shaped to support the projector, the eyewear device, and a projector control device;
   capturing, using the stereo camera, a series of photographs each comprising a pair of raw images;
   generating, using the projector control device, a unique invite associated with the series of photographs;
   broadcasting the unique invite using the wireless transceiver to a plurality of second eyewear devices;
   establishing a condition, wherein the condition comprises receiving an acceptance of the unique invite from a threshold number of the plurality of second eyewear devices;
   based on the condition, transmitting the series of photographs to the projector using the wireless transceiver; and
   projecting the series of photographs onto a screen using the projector for viewing by at least the threshold number of the plurality of second eyewear devices.

2. The method of claim 1, wherein the pair of raw images comprises a left channel image and a right channel image, wherein the projector comprises a left projector and a right projector, and
   wherein the step of projecting comprises projecting the left channel image using the left projector and projecting the right channel image using the right projector, such that the left and the right projectors cooperate to present the series of photographs in a three-dimensional format.

3. The method of claim 1, wherein the unique invite comprises an identifier, a projection type, a projection start time, a viewing time window, a viewing location, a proximity limit relative to the viewing location, a list of addresses associated with a finite subset of the plurality of second eyewear devices, or an expiration time, and
   wherein the step of broadcasting further comprises tailoring the broadcasting according to the unique invite.

4. The method of claim 1, further comprising:
   applying a timestamp to the pair of raw images;
   generating visual content suitable for display in a three-dimensional format according to the timestamp, wherein the visual content is an item selected from the group consisting of: a stereo pair of images, a stereo pair of images with added sound, a stereo video, and a stereo video with sound; and
   associating the unique invite with the visual content,
   wherein the step of transmitting comprises transmitting the visual content, and
   wherein the step of projecting comprises projecting the visual content in the three-dimensional format.

5. The method of claim 4, wherein the unique invite comprises a projection type indicating display in the three-dimensional format, and wherein a first subset of the plurality of second eyewear devices comprises a pair of lenses, a second processor, and an image processor, the method further comprising:
   accepting the unique invite using the second processor; and
   wherein the step of projecting, using the image processor of one or more of the first subset of second eyewear devices, comprises engaging an active shutter mode.

6. The method of claim 1, further comprising:
   synchronizing the series of photographs, using the projector control device, between and among a plurality of projectors.

7. The method of claim 6, further comprising:
   sizing and shaping the interior to further support a charging system configured to charge at least one of the eyewear device or the projector, wherein the charging system is powered by a selectively releasable external power supply.

8. A content sharing system comprising:
   an eyewear device comprising a processor, a memory, a stereo camera, and a wireless transceiver;
   a projector; and
   a housing defining an interior sized and shaped to support the projector, the eyewear device, and a projector control device,
   wherein the eyewear device further comprises programming in the memory, wherein execution of the programming by the processor configures the eyewear device to perform functions, including functions to:

communicate with the projector and the projector control device;
capture, using the stereo camera, a series of photographs each comprising a pair of raw images;
direct the projector control device to generate a unique invite associated with the series of photographs;
broadcast the unique invite using the wireless transceiver to a plurality of second eyewear devices;
establish a condition, wherein the condition comprises receiving an acceptance of the unique invite from a threshold number of the plurality of second eyewear devices;
based on the condition, transmit the series of photographs to the projector using the wireless transceiver; and
project the series of photographs onto a screen using the projector for viewing by at least the threshold number of the plurality of second eyewear devices.

9. The content sharing system of claim 8, wherein the pair of raw images comprises a left channel image and a right channel image, wherein the projector comprises a left projector and a right projector, and
wherein the function to project the series of photographs further comprises functions to:
project the left channel image using the left projector; and
project the right channel image using the right projector, such that the left and the right projectors cooperate to present the series of photographs in a three-dimensional format.

10. The content sharing system of claim 8, wherein the function to broadcast the unique invite further comprises a function to:
tailor the broadcast according to the unique invite, wherein the unique invite comprises an identifier, a projection type, a projection start time, a viewing time window, a viewing location, a proximity limit relative to the viewing location, a list of addresses associated with a finite subset of the plurality of second eyewear devices, or an expiration time.

11. The content sharing system of claim 8, wherein the execution of the programming further configures the eyewear device to perform functions to:
apply a timestamp to the pair of raw images;
generate visual content suitable for display in a three-dimensional format according to the timestamp, wherein the visual content is an item selected from the group consisting of: a stereo pair of images, a stereo pair of images with added sound, a stereo video, and a stereo video with sound;
associate the unique invite with the visual content;
transmit the visual content; and
project the visual content in the three-dimensional format.

12. The content sharing system of claim 11, wherein the unique invite comprises a projection type indicating display in the three-dimensional format, and wherein a first subset of the plurality of second eyewear devices comprises a pair of lenses and an image processor, and
wherein the execution of the programming further configures the eyewear device to perform functions to:
engage an active shutter mode in one or more of the first subset using the image processor.

13. The content sharing system of claim 8,
wherein the function to project the series of photographs further comprises a function to synchronize the series of photographs, using the projector control device, between and among a plurality of projectors.

14. The content sharing system of claim 13, further comprising:
a charging system supported by the housing and configured to charge at least one of the eyewear device or the projector; and
a selectively releasable external power supply coupled to the charging system.

15. A non-transitory computer-readable medium storing program code that, when executed, is operative to cause a processor of an eyewear device to perform the steps of:
communicating with a projector and a projector control device, both supported by a housing defining an interior sized and shaped to further support the eyewear device;
capturing, using a stereo camera, a series of photographs each comprising a pair of raw images;
generating, using the projector control device, a unique invite associated with the series of photographs;
broadcasting the unique invite using a wireless transceiver to a plurality of second eyewear devices;
establishing a condition, wherein the condition comprises receiving an acceptance of the unique invite from a threshold number of the plurality of second eyewear devices;
based on the condition, transmitting the series of photographs to the projector using the wireless transceiver; and
projecting the series of photographs onto a screen using the projector for viewing by at least the threshold number of the plurality of second eyewear devices.

16. The non-transitory computer-readable medium storing program code of claim 15, wherein the pair of raw images comprises a left channel image and a right channel image, wherein the projector comprises a left projector and a right projector, and
wherein the program code when executed is operative to cause the processor to perform the further steps of:
projecting the left channel image using the left projector; and
projecting the right channel image using the right projector, such that the left and the right projectors cooperate to present the series of photographs in a three-dimensional format.

17. The non-transitory computer-readable medium storing program code of claim 15, wherein the program code when executed is operative to cause the processor to perform the further steps of:
applying a timestamp to the pair of raw images;
generating visual content suitable for display in a three-dimensional format according to the timestamp, wherein the visual content is an item selected from the group consisting of: a stereo pair of images, a stereo pair of images with added sound, a stereo video, and a stereo video with sound; and
associating the unique invite with the visual content,
wherein the step of transmitting comprises transmitting the visual content, and
wherein the step of projecting comprises projecting the visual content in the three-dimensional format.

18. The non-transitory computer-readable medium storing program code of claim 17, wherein the unique invite comprises a projection type indicating display in the three-dimensional format,
wherein a first subset of the plurality of second eyewear devices comprises a pair of lenses and an image processor, and
wherein the program code when executed is operative to cause the processor to perform the further steps of:
engaging an active shutter mode in one or more of the first subset using the image processor.

19. The non-transitory computer-readable medium storing program code of claim 15, wherein the program code when executed is operative to cause the processor to perform the further steps of:

charging at least one of the eyewear device or the projector using a charging system supported by the housing.

* * * * *